United States Patent
Fura et al.

(10) Patent No.: US 12,437,059 B2
(45) Date of Patent: Oct. 7, 2025

(54) WORKLOAD PATTERN DETECTION

(71) Applicant: International Business Machines Corporation, Armonk, NY (US)

(72) Inventors: Loic Fura, Poughkeepsie, NY (US); Chon N. Lei, Poughkeepsie, NY (US); Joseph Gentile, Wappingers Falls, NY (US); Jayapreetha Natesan, Hopewell Junction, NY (US); Abuchi Obiegbu, Poughkeepsie, NY (US); Olayinka Adesanya, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 18/341,832

(22) Filed: Jun. 27, 2023

(65) Prior Publication Data

US 2025/0005140 A1   Jan. 2, 2025

(51) Int. Cl.
  *G06F 21/55*   (2013.01)
  *G06N 7/01*   (2023.01)

(52) U.S. Cl.
  CPC .......... *G06F 21/552* (2013.01); *G06N 7/01* (2023.01); *G06F 2221/034* (2013.01)

(58) Field of Classification Search
  CPC ...................................................... G06N 7/01
  See application file for complete search history.

(56) References Cited

U.S. PATENT DOCUMENTS

| | | | |
|---|---|---|---|
| 6,574,727 B1 * | 6/2003 | Davidson | G06F 9/3854 703/22 |
| 10,089,459 B2 | 10/2018 | Sridhara | |
| 10,459,849 B1 | 10/2019 | Shorb et al. | |
| 10,503,904 B1 | 12/2019 | Singh et al. | |
| 10,607,009 B2 | 3/2020 | Dahan | |
| 10,880,328 B2 | 12/2020 | Farhady | |
| 10,997,288 B2 | 5/2021 | Cudak | |
| 11,144,638 B1 | 10/2021 | Golden | |
| 11,347,500 B2 | 5/2022 | Krishnamoorthy et al. | |
| 11,347,849 B2 | 5/2022 | Hicks | |
| 11,374,946 B2 | 6/2022 | Hewlett, II | |
| 11,620,379 B1 | 4/2023 | Hegde et al. | |

(Continued)

FOREIGN PATENT DOCUMENTS

IN   202131001289 A   2/2021

OTHER PUBLICATIONS

"Ransomware Protection Market Size and Forecast", Verified Market Research, accessed on Feb. 3, 2023, 6 pages, <https://www.verifiedmarketresearch.com/product/ransomware-protection-market/>.

Braue, David, "Global Ransomware Damage Costs Predicted to Exceed $265 Billion by 2031", 2022 Cybersecurity Ventures, 10 pages, <https://cybersecurityventures.com/global-ransomware-damage-costs-predicted-to-reach-250-billion-usd-by-2031/>.

(Continued)

*Primary Examiner* — Tod R Swann
*Assistant Examiner* — Amir Mahdi Hajiabbasi
(74) *Attorney, Agent, or Firm* — Elliot J. Shine (57) ABSTRACT

A computer-implemented method, computer program product and computer system are provided. A processor retrieves instructions for a plurality of processes. A processor generates a sample of the instructions for the plurality of processes. A processor determines a probability that the sample includes instructions from malicious processes. A processor, in response to the probability exceeding a threshold value, restricts one or more aspects of operation for at least one process of the plurality of processes.

16 Claims, 5 Drawing Sheets

(56) References Cited

U.S. PATENT DOCUMENTS

| | | | |
|---|---|---|---|
| 2013/0326625 A1* | 12/2013 | Anderson | G06F 21/566 |
| | | | 726/23 |
| 2015/0058984 A1* | 2/2015 | Shen | G06F 21/52 |
| | | | 726/23 |
| 2016/0173516 A1* | 6/2016 | Raugas | G06N 7/01 |
| | | | 726/23 |
| 2019/0042745 A1* | 2/2019 | Chen | G06V 20/62 |
| 2019/0197239 A1 | 6/2019 | Govardhan | |
| 2019/0199736 A1* | 6/2019 | Howard | H04L 63/1425 |
| 2019/0303116 A1 | 10/2019 | Ding et al. | |
| 2019/0340392 A1 | 11/2019 | Khorrami et al. | |
| 2021/0328969 A1 | 10/2021 | Gaddam et al. | |
| 2022/0138319 A1 | 5/2022 | Kim | |
| 2022/0309160 A1 | 9/2022 | Xiao et al. | |
| 2022/0311798 A1 | 9/2022 | Dani et al. | |
| 2023/0252136 A1* | 8/2023 | Kim | G06F 21/566 |
| | | | 726/22 |
| 2023/0281308 A1* | 9/2023 | Maimon | G06F 21/563 |
| | | | 726/25 |
| 2023/0281315 A1* | 9/2023 | Capellman | G06F 21/577 |
| | | | 726/25 |
| 2024/0362335 A1* | 10/2024 | Biondi | G06F 21/566 |

OTHER PUBLICATIONS

Disclosed Anonymously, "Method of Early Detection and Halting of Ransomware Attacks", IP.com No. IPCOM000268682D, IP.com Electronic Publication Date: Feb. 15, 2022, 5 pages.

Disclosed Anonymously, "System and Method for Reducing False Positives in the Failure Prediction of an Operating System", IP.com No. IPCOM000266634D, IP.com Electronic Publication Date: Aug. 4, 2021, 11 pages.

Faruk et al., "Malware Detection and Prevention using Artificial Intelligence Techniques", 2021 IEEE International Conference on Big Data (Big Data), ResearchGate, Conference Paper—Dec. 2021, 10 pages.

Gulmez et al., "Graph-Based Malware Detection Using Opcode Sequences", 2021 9th International Symposium on Digital Forensics and Security (ISDFS), © 2021 IEEE, 5 pages.

Jeon et al., "Malware-Detection Method with a Convolutional Recurrent Neural Network Using Opcode Sequences", Information Sciences, 2020, © 2020 Published by Elsevier Inc., 19 pages.

Jha et al., "Recurrent Neural Network for Detecting Malware", Computers & Security 99, 2020, © 2020 Elsevier Ltd., 13 pages.

Masum et al., "Ransomware Classification and Detection With Machine Learning Algorithms", ResearchGate, Conference Paper—Jan. 2022, 7 pages.

Niu et al., "Opcode-Level Function Call Graph Based Android Malware Classification Using Deep Learning", Sensors 2020, Published: Jun. 29, 2020, 21 pages.

Patel et al., "Analyzing Hardware Based Malware Detectors", DAC '17, Jun. 18-22, 2017, Austin, TX, USA, © 2017 ACM, 6 pages.

Singh et al., "Ransomware Detection using Process Memory", Proceedings of the 17th International Conference on Information Warfare and Security, 2022, 10 pages.

Wikipedia, "Swiss cheese model", access on Feb. 3, 2023, 3 pages, <https://en.wikipedia.org/wiki/Swiss_cheese_model>.

Zhang, et al., "Classification of Ransomware Families with Machine Learning Based on N-Gram of Opcodes", Future Generation Computer Systems 90, 2019, 11 pages.

Danducci II et al., "Detection of Malicious Encryption Based on Machine Learning", U.S. Appl. No. 18/341,841, filed Jun. 27, 2023, 31 pages.

IBM Appendix P, list of patents and patent applications treated as related, Filed Herewith, 2 pages.

Wikipedia, "Logistic regression", Retrieved from: https://web.archive.org/web/20240101081307/https://en.wikipedia.org/wiki/Logistic_regression, Retrieval date, Jan. 1, 2024, 28 pages.

* cited by examiner

FIG. 5

WORKLOAD PATTERN DETECTION

BACKGROUND OF THE INVENTION

The present invention relates generally to the field of workload inspection, and more particularly to inspecting instruction data of potentially malicious programs.

Workload inspection and malware detection are processes of inspection and evaluating what is executing on a computing system. Malicious actors are constantly attempting new and creative ways to get users to execute code that may compromise users' systems. In distributed computing platforms, bad actors will create numerous accounts to exploit the power of the platforms for attacks, such as in distributed denial of services attacks. As such, observing the code executing on a system is crucial in maintain security.

SUMMARY

Embodiments of the present invention provide a method, system, and program product to classify instructions based on a machine learning model. A processor retrieves instructions for a plurality of processes. A processor generates a sample of the instructions for the plurality of processes. A processor determines a probability that the sample includes instructions from malicious processes. A processor, in response to the probability exceeding a threshold value, restricts one or more aspects of operation for at least one process of the plurality of processes.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
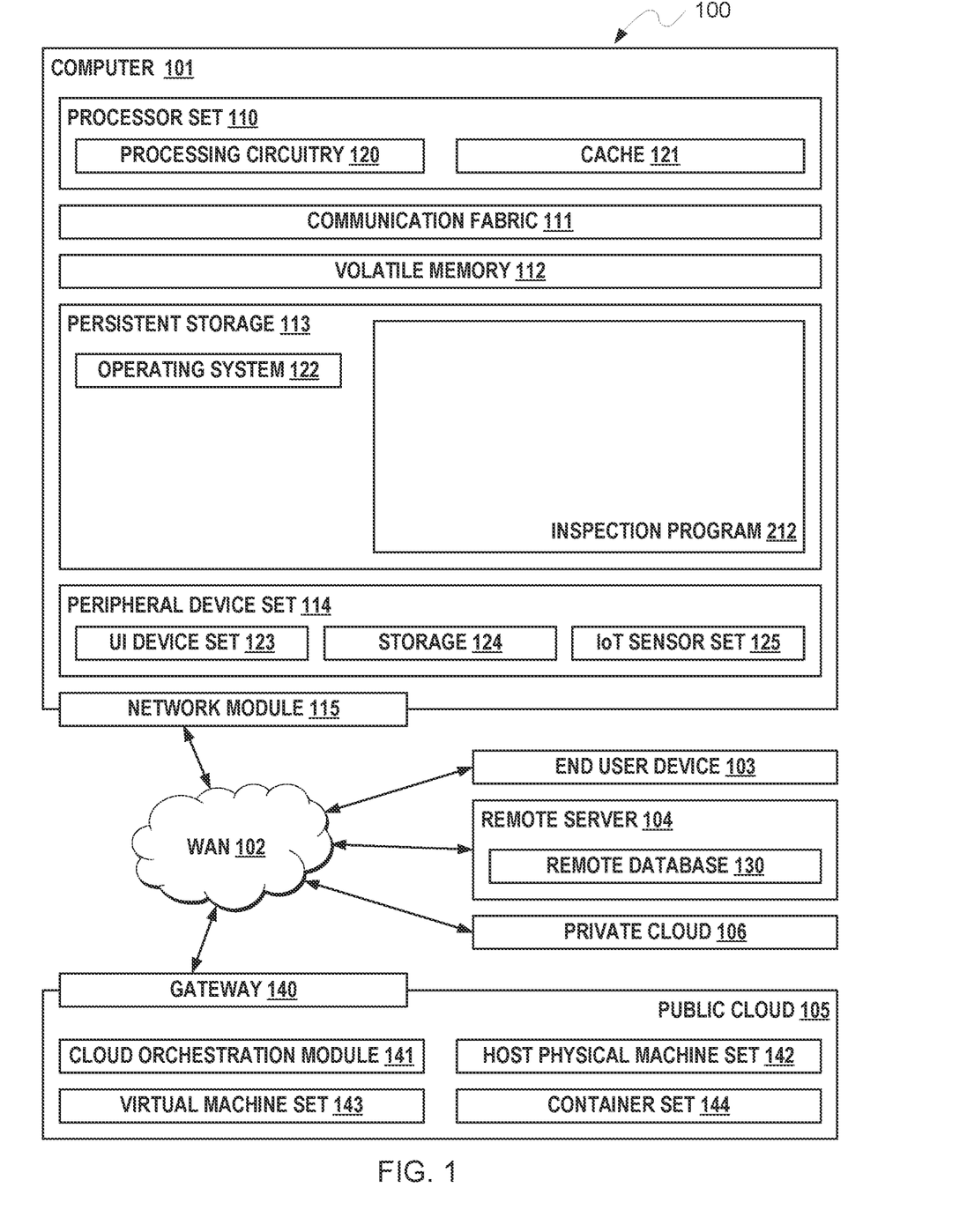
FIG. 1 depicts a block diagram of components of the computing device executing an inspection program, in accordance with an exemplary embodiment of the present invention.

Computing environment 100 contains an example of an environment for the execution of at least some of the computer code involved in performing the inventive methods, such as inspection program 212, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods (i.e., inspection program 212) may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
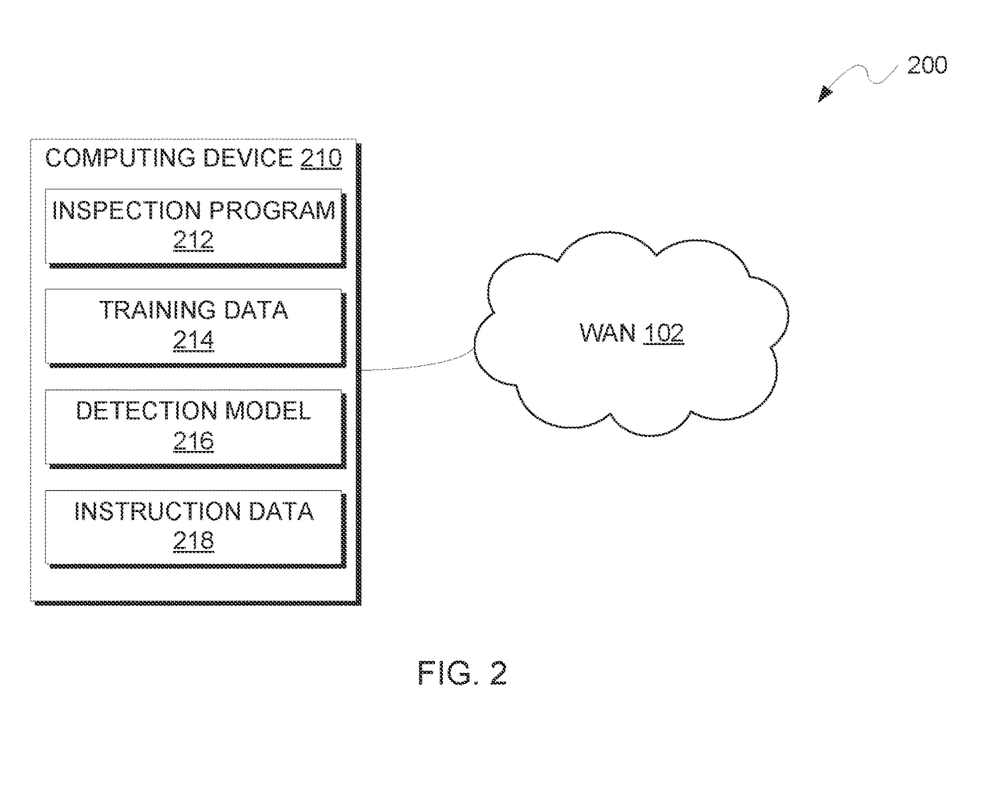
FIG. 2 is a functional block diagram illustrating a networked environment, in accordance with an exemplary embodiment of the present invention.

FIG. 2 is a functional block diagram illustrating networked environment, generally designated 200, in accordance with one embodiment of the present invention. Networked environment 200 includes computing device 210 connected to WAN 102. Computing device 210 includes inspection program 212, training data 214, detection model 216 and instruction data 218.

In various embodiments, inspection program 212 trains and deploys detection model 216 to inspect and determine whether malware is being executed on computing device 210. Detection model 216 is a neural network machine learning model which, when trained, can determine a probability that malware is currently executing on computing device 210. Detection model 216 can be any classifier neural network that can generate a probability of malware based on sampled instructions such as, but not limited to, deep neural networks (DNN), support vector machines (SVMs) and any classifier neural network or machine learning model.

As discussed herein, for clarity, inspection program 212 is disclosed as recording and sampling instructions, as instruction data 218, from programs executing on computing device 210. In various other embodiments and scenarios, instruction data 218 includes instructions from programs executing on other devices (not shown). For example, computing device 210 in connected or otherwise part of public cloud 105 or private cloud 106, with instruction data 218 collected from various devices, logical or physical, in the cloud architectures. In such scenarios, instruction data 218 may include information attributing the instructions to a logical or physical device in the cloud architectures. In various embodiments, inspection program 212 samples instruction data 218 to generate instruction samples for both training and evaluation. In these samples, instructions are randomly and non-sequentially selected from instruction data 218 creating a set of statistical distribution of data, or subsets if further filtering is applied to the set. Additionally, instruction data 218 includes filtering aspects that attribute the instructions to a process and/or device that instruction data 218 was gather from.

In various embodiments, inspection program 212 trains detection model 216 based on training data 214. Training data 214 includes various instructions executed by various programs. Additionally, training data 214 is pre-classified as either belonging to a malicious or non-malicious program. Inspection program 212 samples training data 214 to build a training set to train detection model 216. As discussed herein, detection model 216 will be supplied a randomized statistical distribution of data of live instruction data 218 that is sampled across various threads, cores and processors. As such, inspection program 212 randomly assembles training sets from training data 214 to simulate a real-world production environment for detection model 216.

In various embodiments, detection model 216 evaluates sampled instruction data 218. Instruction data 218 includes various instructions that were executed by various programs on devices monitored by inspection program 212. Instructions are the binary operational codes (opcodes) that are executed by a processors of computing device 210, or other devices monitored by inspection program 212. For example the instruction "add a,b" has "add" as an operator or operation being performed and "a" and "b" are the operands or values that part of the operation (i.e., a+b). Additionally, some instructions may manipulate system memory and other parts of computing device 210. For example, "write a,x" writes the value in "register a" of the processor to system memory address "x". As such, instruction data 218 may include any addresses or registers accessed by the corresponding instructions.

In various embodiments, detection model 216 generates a probability of the sampled instruction data 218. To determine relationship between instruction data and the probability of maliciousness, detection model 216 utilizes machine learning models to estimate the relationship between a sampled instruction data 218 and the likelihood or probability the sampled instructions included malicious patterns. For example, detection model 216 may be implemented as a logistic regression model. Example logistic regression models include, but are not limited to, binary logistic regression, multinomial logistic regression, or ordinal logistic regression. With logistic regression, detection model 216 can distinguish between classes (or categories), like a classifier model, but also produce a numerical relationship between the sampled instructions and the likelihood or probability the sampled instructions contain malware. Various other machine learning models may be used with detection model 216 without deviating from the present invention. Example machine leaning models that detection model may use include, but are not limited to, deep neural networks (DNN), support vector machines (SVMs) and any classifier neural network or machine learning model.

In various embodiments, inspection program 212 gathers instruction data 218 from each process executing on computer device 210 or otherwise monitored by computer device 210, such as processes executing in a distributed computing platform. Once enough instructions are recorded or after a predetermined amount of time (e.g., every few seconds or microseconds) has passed, inspection program 212 generates a sample of instruction data 218. As with training, inspection program 212 supplies the sample of instruction data 218 as input to the detection model 216. Detection model 216 generates a probability the sample of instruction data 218 contains instructions indicative of malicious processes being executed. When the probability generated by detection model 216 exceeds a threshold value, then inspection program 212 raises an alert and restricts, quarantines or otherwise modifies the access of any process that was included in the sample.

In some embodiments, when a sample of instruction data 218 has a classification probability the exceeds a threshold amount, inspection program 212 filters the sampled instruction data 218 based on various identifiers of the processes contained in the sample, such as, but not limited to, addresses, process IDs, thread IDs, and processor IDs (physical and, when applicable, logical for distributed computing platforms). If a sample is classified as malicious, inspection program 212 generates samples for each process, thread or device contained in the sample. Inspection program 212 can then narrow down which process, thread or device contains malicious instructions by repeating the above process few each filtered sample.

By initially analyzing large "buckets" or samples across multiple devices or processes, inspection program 212 can evaluate larger amounts of endpoints in a single evaluation. In most cases, the vast majority of processes are benign or non-malicious, with a few bad actors. By sampling across multiple groups at once, non-malicious processes can be easily eliminated from search and inspection, thereby increasing speed of finding malicious processes. Additionally, since inspection program 212 generates randomized samples and with sample institution data 218 being non-sequential, techniques to bypass typical instruction inspection by malware detector are not effective. Some malwares will insert "dummy" instructions to bypass inspection. Prior "fingerprinting" malware detectors look for particular sequential patterns in instruction data, but can be tricked by changes to instructions of a malicious process. Embodiments of the present invention overcome this shortcoming by analyzing instructions as a distribution of instructions, since the instructions are non-sequential and randomized when provided to detection model 216.

One of ordinary skill in the art will appreciate that embodiments of the present invention can be applied to other types of classification of workloads or processes based on sampled instruction data 218. For example, detection model 216 can be trained with different sampled instructions to generate probability of different types of processes, such as crypto-mining. In such a scenario, training data 214 includes normal instructions from benign processes, as discussed herein, but instead of additional instructions from malicious processes, samples from crypto-mining processes are used instead. Example areas for probability classification that detection model 216 can be trained to detect include, but are not limited to, malware, crypto-mining, excessive resource usage, excessive network activity and the like.

In some embodiments, detection model 216 may be trained based on a variety of external factors. Some malicious actors and processes operate based on other factors, such as distributed denial of service attacks being coordinated to occur across multiple devices to have a greater impact on a target. As such, detection model 216 may be trained, in conjunction with instructions, other external factors such as, but not limited to, time of day, user information, length of execution, age of account and the like.

In various embodiments, inspection program 212 collects instruction data 218 from a variety of processes during execution. Inspection program 212 samples all the instructions from the various processes executing on computing device 210, or another device monitored by computing device 210 such as in a distributed processing/computing environment. Then inspection program 212 filters the collected instruction data 218 into a sample for each process. Based on the captured process ID, inspection program 212 creates a sample of instructions for each process. In some scenarios, inspection program 212 may create multiple samples for the same process. Once a subsample of instruction data 218 for a process is generated, inspection program 212 supplies the sample to detection model 216. As discussed herein, detection model 216 generates a probability determination that the sample of the process contains malicious instructions. If the probability exceeds a threshold value or percentage, then detection model 216 will halt or otherwise restrict at least one aspect of the process (e.g., restrict network activity or other resources). If a process does not exceed the threshold probability, then inspection program 212 will continually monitor the process. In some scenarios, certain processes may be permitted to execute without being evaluated by inspection program 212, such as user-designated processes or operating system processes.

Figure 3:
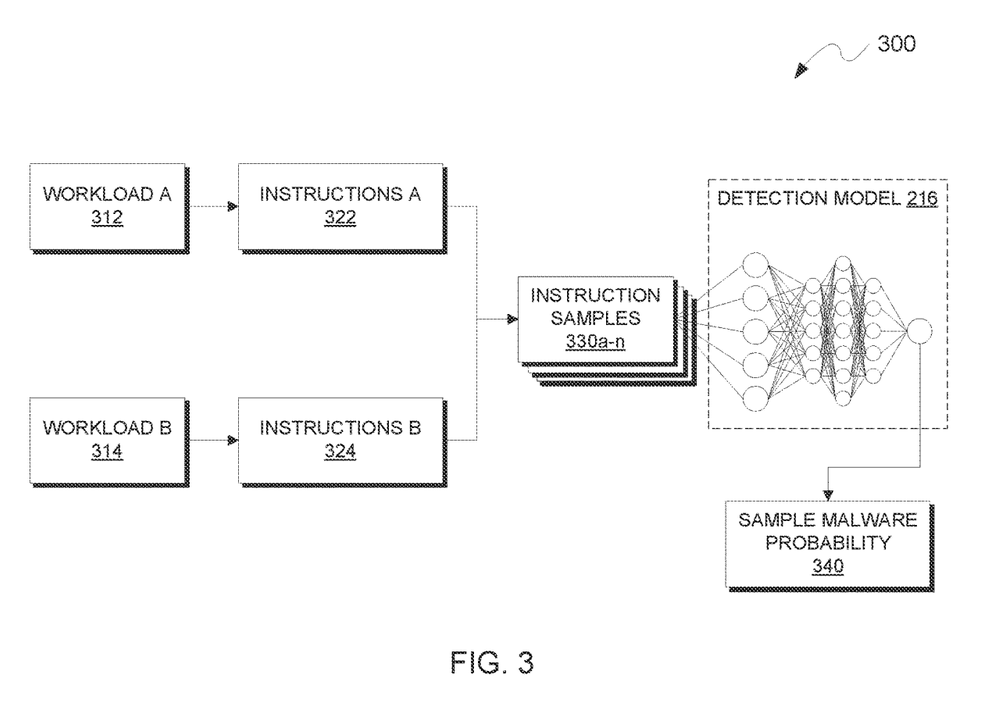
FIG. 3 depicts an example diagram for training a detection model for malware.

FIG. 3 depicts an example diagram 300 for training detection model 216. As discussed herein, the instructions from various workloads or processes are collected. In this example, workload A 312 and workload B 314 are shown for simplicity. One of ordinary skill in the art will appreciate that a larger number of workloads may be sampled without deviating from the invention. For each workload, the respective instructions A 322 and instructions B 324 are retrieved. Additionally, for additional latent feature analysis, other external factors may also be included with respective instructions A 322 and instructions B 324 for training of detection model 216.

In various embodiments, instruction samples 330a-n are generated from combining the retrieved instructions from workloads 312 and 314. Each sample of instruction samples 330a-n is a statistical distribution of data across all workloads being sampled. In various scenarios, the distribution of instructions from each workload is uniform (e.g., the same number of instructions in a sample from workload A 312 is equivalent, or reasonably close, to the number of samples from workload B).

In some scenarios and embodiments, detection model 216 is a machine learning model that performs logistic regression. Logistic regression models predict the probability that a data set is a member of a class. In this scenario, detection model 216 is trained to predict the sample malware probability 340 that reflects the degree to which the instruction samples 330a-n contain instructions from malicious programs. In various scenarios, detection model 216 is supervised during training via instruction samples 330a-n. As training data 214, instruction samples 330a-n include predetermined classifiers to indicate during training whether workloads are malicious or non-malicious. During training, a user ensures that detection model 216 generates probabilities reflective of the samples (i.e., if a sample includes malicious code, then training ensures the output of the logistic regression model exceeds the threshold amount used to classify malicious workloads).

Once trained and sample malware probability 340 properly reflects the instruction samples 330a-n, detection model 216 is ready for deployment in production. When deployed, detection model 216 operates similarly to training, where instructions from monitored workloads, similar to workload A 312 and workload B 314, are recorded as instruction data 218. Inspection program 212 generates instructions samples, similar to instruction samples 330a-n, of the monitored workloads. These samples are supplied to a trained detection model 216, which produces a probability the sample of monitored workloads contains malicious code. As discussed herein, when a sample is found to exceed a threshold probability (such as greater than 50%), then inspection program 212 may restrict the workloads in the sample or may further filter down workloads in the sample until a workload is singled out as being malicious, and maintaining the restriction on the malicious workload while releasing the other non-malicious workloads in the sample.

Figure 4:
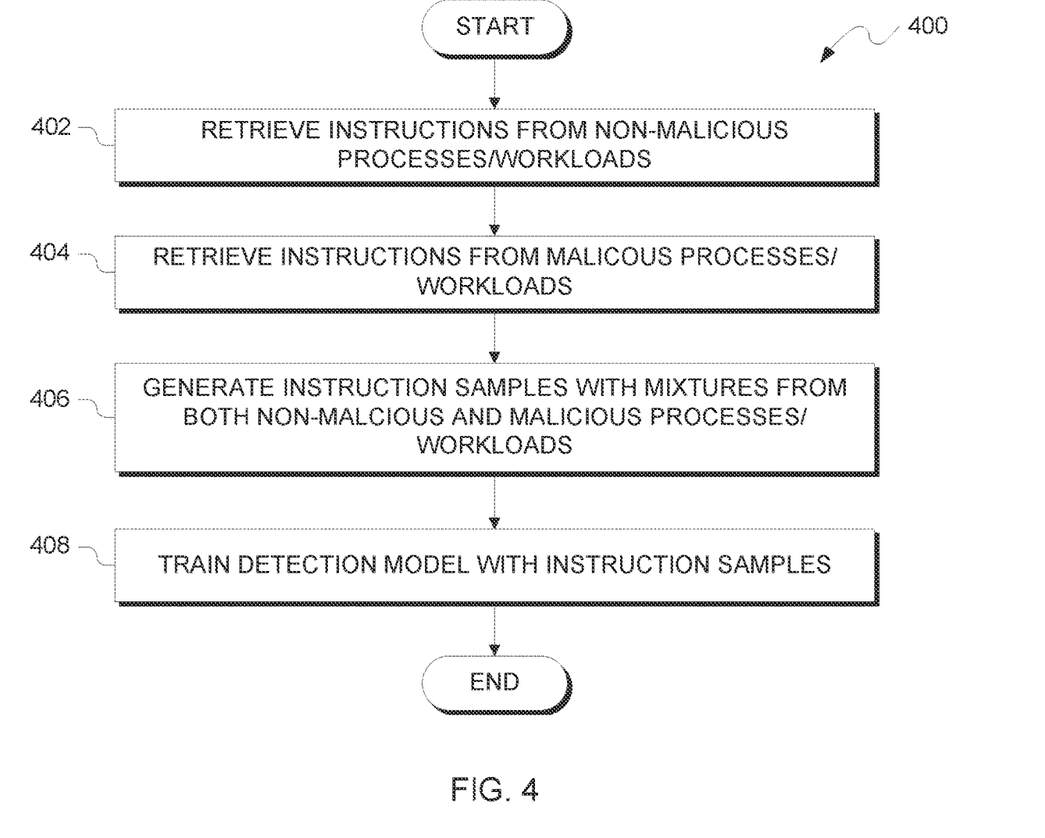
FIG. 4 illustrates operational processes of training a detection model for malware, on a computing device within the environment of FIG. 1, in accordance with an exemplary embodiment of the present invention.

FIG. 4 illustrates operational processes, generally designated as 400, of training detection model 216. In process 402, detection program 212 retrieves instructions from non-malicious processes (for on device protection) or workloads (for workload monitoring in a distributed computing platform). In process 404, detection program 212 retrieves instructions from malicious processes or workloads. As discussed herein, both groups are labeled for training of detection model 216. Both data sets serve as training data 214

In process 406, inspection program 212 generates various samples of instructions by mixing instructions across various processes or workloads. For example, inspection program 212 may generate sample via a monte-carlo method. One of ordinary skill in the art will appreciate that any method or process of randomizing and mixing samples may be used without deviating from the invention. In various scenarios, there is a tradeoff between sample size and efficiency. Based on the computing environment, capabilities of computing device 210 and what is being monitored, inspection program 212 may alter the sample size and rate.

In process 408, inspection program 212 trains detection model 216. As discussed herein, detection model 216 perform logistic regression which produces a probability the sample is part of a class, in this case, malicious workloads/processes. Once detection model 216 produces probabilities representative of the sampled training data 214 with a certain degree of confidence after repeated trials, then detection model 216 is trained and ready for deployment.

Figure 5:
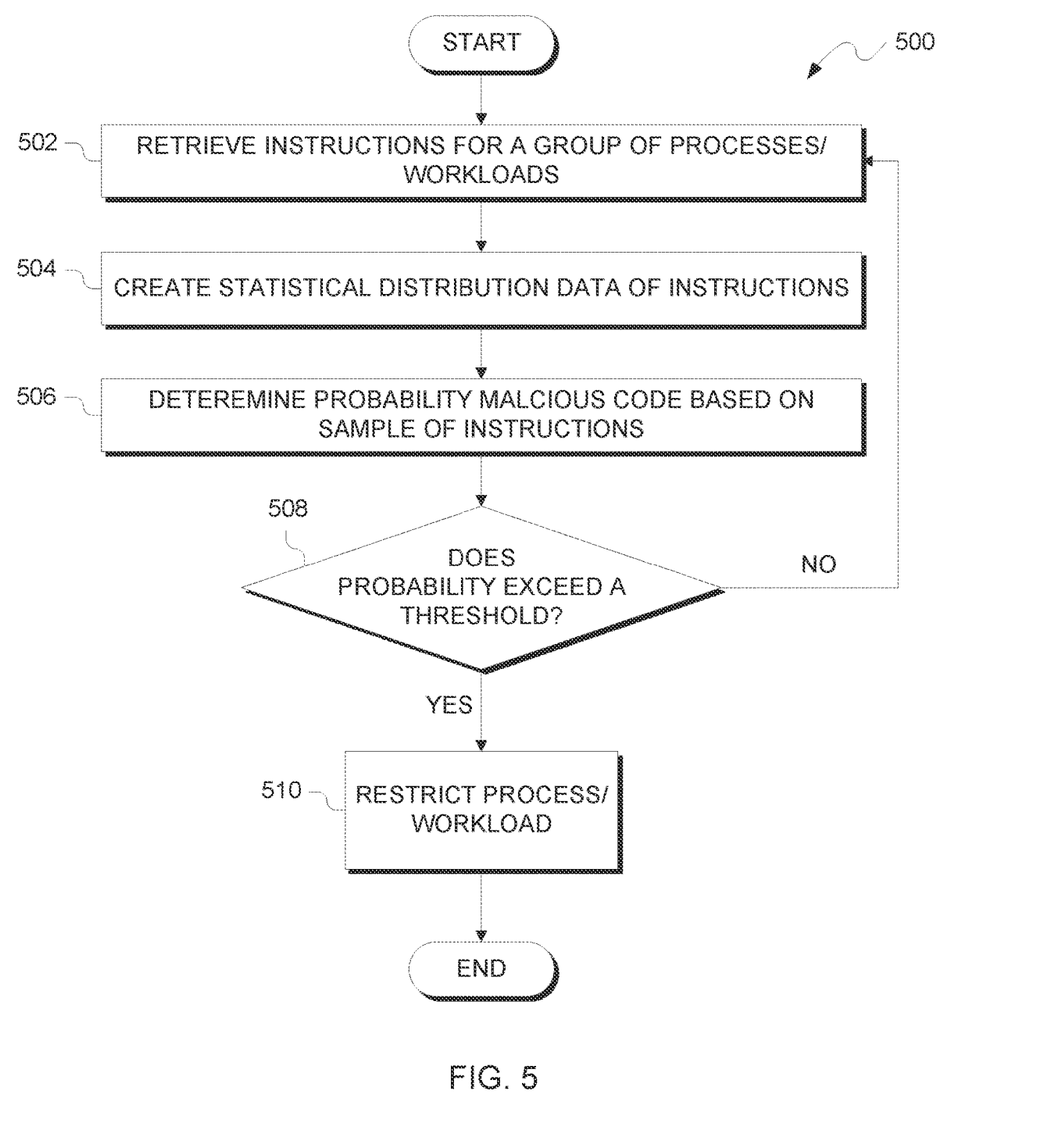
FIG. 5 illustrates operational processes of detecting malware with the trained detection model, on a computing device within the environment of FIG. 1, in accordance with an exemplary embodiment of the present invention.

FIG. 5 illustrates operational processes, generally designated as 500, of deploying detection model 216 by inspection program 212. In process 502, inspection program 212 retrieves instructions from a variety of processes or workloads being monitored. As discussed herein, in some scenarios, inspection program 212 inspects and monitors processes executing on computing device 210. In other scenarios, inspection program 212 inspects and monitors processes on devices other than computing device 210, such as in a distributed cloud computing platform. One of ordinary skill in the art will appreciate that the instructions retrieved in process 502 can originate from any device that is communicatively coupled to computing device 210 without deviating from the invention.

In process 504, inspection program 212 creates a statistical distribution data of instructions. Due to the training of detection model 216, the model does not take into account the sequencing of the instructions when executed, such as the prior solution of fingerprinting which matches series of instructions to known malicious code. Instead, the model observes the distribution or rate of occurrence of potentially malicious instructions. If the sample includes enough instructions indicative of malicious code, then the probability generated by detection model 216 increases.

In process 506, detection model 216, when supplied sampled instructions, generates a probability of malicious code in regards to the sampled instructions. As discussed herein, detection model 216 is a machine learning model that determines a probability a group belongs to a class. After being trained, detection model 216 generates a probability that the sample instructions contain malicious code. In decision process 508, if the probability exceeds a threshold value (YES branch), then inspection program 212 restricts, halts, quarantines or otherwise modifies access of the workloads or processes contained in the sample (process 510). If the malicious probability of a sample does not exceed the threshold (NO Branch of detection process 508), then inspection program 212 generates a new sample for another batch or grouping of processes or workloads.

As discussed herein, when a sample is indicative of malicious code and the classifier probability of the detection model 216 exceeds the threshold, then inspection program 212 may restrict the workloads of the sample. In turn, inspection program 212 may generates a subsample of instructions that filters out one or more processes/workloads from the initial sample. In this arrangement, then inspection program 212 inspects a subset of the processes and workloads, filtering out workloads to determine if the probability changes by removing a process/workload from the sample. If the maliciousness probability decreases when a process is removed, then the process was contributing to the maliciousness of the sample and will be added back. If the maliciousness probability increases, then the process did not contribute to the maliciousness probability and will be removed from future subsamples. By doing the above, inspection program 212 filters out non-malicious workloads and processes until the offending malicious workload/process is found.

In some embodiments, a trained detection model 216 and functions and features of inspection program 212 are implemented as a hardware module connected directly to a processor. For example, specialized processors or other digital logic may be etched or otherwise communicatively coupled to a processor of computing device 210. Example hardware modules include, but are not limited to, hardware accelerators, secondary caches, or additional logic such as a fully programmable gate array (FPGA) or secondary processor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer-implemented method comprising:
retrieving instructions for a plurality of processes;
generating a sample of the instructions for the plurality of processes, wherein the sample of the instructions are non-sequential in regards to the instructions execution order, and wherein the sample of the instructions are randomly selected and include filtering aspects that attribute the sample to a device or process the sample of the instructions are retrieved from;
determining, using a machine learning model, a probability that the sample includes instructions from malicious processes;
in response to the probability exceeding a threshold value, restricting one or more aspects of operation for at least one process of the plurality of processes;
filtering, in response to the probability exceeding the threshold value, at least one process from the sample based on one or more identifiers corresponding to the filtering aspects that attribute the sample to the device or the process;
and generating a sample for at least each process and device that includes the instructions from the malicious process.

2. The computer-implemented method of claim 1, wherein the machine learning model is a logistic regression model.

3. The computer-implemented method of claim 1, wherein the machine learning model includes on or more of the following models: a deep neural network (DNN) or a support vector machine (SVM).

4. The computer-implemented method of claim 1, the method further comprising:
in response to the probability exceeding the threshold value, filtering at least one process from the sample; and
determining a filtered probability that the filtered sample includes instructions from malicious processes.

5. The computer-implemented method of claim 1, wherein the determining the probability that the sample includes instructions from malicious processes is performed by a hardware module connected to a processor executing the more than one process.

6. A computer program product comprising:
one or more computer-readable storage media and program instructions stored on the one or more computer-readable storage media, the program instructions comprising:
program instructions to retrieve instructions for a plurality of processes;
program instructions to generate a sample of the instructions for the plurality of processes, wherein the sample of the instructions are non-sequential in regards to the instructions execution order, and wherein the sample of the instructions are randomly selected and include filtering aspects that attribute the sample to a device or process the sample of the instructions are retrieved from;
program instructions to determine, using a machine learning model, a probability that the sample includes instructions from malicious processes;
program instructions, in response to the probability exceeding a threshold value, to restrict one or more aspects of operation for at least one process of the plurality of processes;
program instructions to filter, in response to the probability exceeding the threshold value, at least one process from the sample based on one or more identifiers corresponding to the filtering aspects that attribute the sample to the device or the process;
and program instructions to generate a sample for at least each process and device that includes the instructions from the malicious process.

7. The computer program product of claim 6, wherein the machine learning model is a logistic regression model.

8. The computer program product of claim 6, wherein the machine learning model includes on or more of the following models: a deep neural network (DNN) or a support vector machine (SVM).

9. The computer program product of claim 7, the program instructions further comprising:
program instructions, in response to the probability exceeding the threshold value, to filter at least one process from the sample; and
program instructions to determine a filtered probability that the filtered sample includes instructions from malicious processes.

10. The computer program product of claim 6, wherein the determining the probability that the sample includes instructions from malicious processes is performed by a hardware module connected to a processor executing the more than one process.

11. A computer system comprising:
one or more computer processors;
one or more computer readable storage media;
and program instructions stored on the computer readable storage media for execution by at least one of the one or more processors, the program instructions comprising:
program instructions to retrieve instructions for a plurality of processes;
program instructions to generate a sample of the instructions for the plurality of processes, wherein the sample of the instructions are non-sequential in regards to the instructions execution order, and wherein the sample of the instructions are randomly selected and include filtering aspects that attribute the sample to a device or process the sample of the instructions are retrieved from;
program instructions to determine, using a machine learning model, a probability that the sample includes instructions from malicious processes;
program instructions, in response to the probability exceeding a threshold value, to restrict one or more aspects of operation for at least one process of the plurality of processes;
program instructions to filter, in response to the probability exceeding the threshold value, at least one process from the sample based on one or more identifiers corresponding to the filtering aspects that attribute the sample to the device or the process;
and program instructions to generate a sample for at least each process and device that includes the instructions from the malicious process.

12. The computer system of claim 11, the program instructions further comprising:
program instructions, in response to the probability exceeding the threshold value, to filter at least one process from the sample; and
program instructions to determine a filtered probability that the filtered sample includes instructions from malicious processes.

13. The computer-implemented method of claim 1, wherein determining the probability that the sample includes instructions from the malicious process further comprises:
training the machine learning model based on a training data set, wherein the training data set is built from samples of the instructions for the plurality of processes retrieved, wherein the samples of the instructions retrieved include pre-classifications as either a malicious or a non-malicious program;
determining, using the machine learning model, a probability for each of the samples from the training data set include instructions from the malicious process, wherein the machine learning model uses logistic regression in determining the probability for each of the samples from the training data set;
verifying, the probability generated by the machine learning model for each of the samples corresponds to the pre-classifications; and
deploying the machine learning model for malicious code detection.

14. The computer-implemented method of claim 1, wherein the instructions retrieved for the plurality of processes are binary operational codes executed by the plurality of processes, and wherein instruction data includes any addresses or registers accessed by the instructions corresponding to the plurality of processes.

15. The computer-implemented method of claim 1, wherein determining the probability that the sample includes instructions from the malicious process further comprises:
creating statistical distribution data of the instructions;
observing, by the machine learning model, a distribution of potentially malicious instructions; and
increasing the probability that the sample includes instructions from malicious processes based on the observing of the distribution of the potentially malicious instructions.

16. The computer-implemented method of claim 1, further comprising:
generating a subsample of the instructions, wherein the subsample filters out one or more processes from the sample with the probability exceeding the threshold value;
determining, using the machine learning model, that the probability the subsample includes instructions from the malicious process is less than the probability that the sample includes instructions from the malicious process;

determining that the one or more processes filtered from the subsample contributed to a maliciousness of the sample; and adding the one or more processes back to the sample and filtering out one or more different processes for a next subsample.

\* \* \* \* \*